United States Patent [19]
Saneyoshi

[11] 4,184,053
[45] Jan. 15, 1980

[54] RINGING SIGNAL DETECTOR
[75] Inventor: Norio Saneyoshi, Tokyo, Japan
[73] Assignee: Iwasaki Tsushinki Kabushiki Kaisha, Japan
[21] Appl. No.: 876,414
[22] Filed: Feb. 9, 1978
[30] Foreign Application Priority Data
  Feb. 12, 1977 [JP] Japan .................. 52-13513
[51] Int. Cl.² ............................. H04M 1/26
[52] U.S. Cl. ................................. 179/84 R
[58] Field of Search ............. 179/84 R, 84 L, 84 T, 179/6 R, 6 E, 2 A, 18 F, 18 FA
[56] References Cited
U.S. PATENT DOCUMENTS
3,723,656 3/1973 Curtis et al. .................. 179/2 A
3,783,193 1/1974 Lee ........................... 179/84 R
4,081,617 3/1978 Clark ......................... 179/84 T Primary Examiner—Bernard Konick
Assistant Examiner—Joseph A. Popek
Attorney, Agent, or Firm—Robert E. Burns; Emmanuel J. Lobato; Bruce L. Adams

[57] ABSTRACT

A ringing signal detector, which comprises a series diode clipper automatically biased by an input signal, a DC converter for converting the output of the series diode clipper to a DC level, a DC level detector for detecting the converted DC level to detect whether the input signal is a ringing signal or a dial pulse signal, thereby generating an output only when the input signal is the ringing signal.

6 Claims, 4 Drawing Figures

RINGING SIGNAL DETECTOR

BACKGROUND OF THE INVENTION

This invention relates to a ringing signal detector which enables discrimination between a ringing signal to a terminal equipment from a communication circuit and a dial pulse signal from a telephone set connected to the communication circuit in parallel to the ringing signal detector.

A conventional ringing signal detector employed in a terminal equipment of a communication circuit comprises an exchange I, a telephone set II, a communication circuit III and a ringing signal detector IV. The ringing signal detector IV comprises a DC blocking capacitor for blocking a DC voltage superimposed on the communication circuit III, a DC converter for converting an AC ringing signal of 16 Hz to a DC voltage and a DC level detector for detecting the ringing signal with a change in the output potential from the DC converter. The ringing signal detector IV detects the ringing signal to start a terminal equipment. With such an arrangement, there is the likelihood of erroneous starting of the terminal equipment as follows: Namely, when a call is originated from the telephone set II connected to the communication circuit III in parallel to the terminal equipment, a dial pulse signal from the dial of the telephone set II is also applied to the terminal equipment and is detected by the ringing signal detector IV, as in the case of the ringing signal, to start the terminal equipment. In a case where a terminal equipment of the type performing automatic answering is connected, upon the starting, a DC loop of the communication circuit III is set up to prevent subsequent dialing, resulting in a serious trouble in that the telephone set II cannot originate a call.

One conventional system of preventing such malfunction is to set the detecting level of the ringing signal detector to be higher than a DC voltage resulting from the application of the dial pulse signal so that the detector will not operate in response to the dial pulse signal. With this system, however, since the states of the exchange I in the central office, the communication circuit III and the dial pulse signal generated by the superimposed DC voltage do not remain constant, the detecting level is difficult to set and must be set to be high. In such a case where the voltage of a ringing signal is low or several telephone sets II are connected in parallel, the ringing signal cannot be detected.

Another system is to prevent the malfunction by the employment of a monitor relay connected in series to the telephone set II while the contact of the monitor relay is connected in series to the DC blocking capacitor. With this system, when the telephone set II is put in the offhook state, the monitor relay operates to open the contact to disconnect or make the ringing signal detector IV of the terminal equipment inoperative, thereby ensuring prevention of the malfunction resulting from the application of the dial pulse signal. Since this system enables complete prevention of such an erroneous operation attendant with dialing, sensitivity for detecting the ringing signal can be enhanced. However, this system has defects in that it is expensive because of the use of the monitor relay and that since the connection of the telephone set II must be changed for the series connection thereto of the monitor relay, the system is not employed in the terminal equipment connected in parallel with the telephone set II.

SUMMARY OF THE INVENTION

An object of this invention is to provide a ringing signal detector which discriminates a ringing signal from a dial pulse signal without using a monitor relay or like means to prevent a terminal equipment from erroneous starting in response to the dial pulse signal.

To attain the above object of this invention, there is proposed a ringing signal detector comprising a series diode clipper automatically biased by an input signal, a DC converter for converting the output of the series diode clipper to a DC level, a DC level detector for detecting the converted DC level to detect whether or not the input signal is a ringing signal by generating an output only when the input signal is the ringing signal. The series diode clipper is responsive to peaks of the input signal for developing a predetermined constant bias voltage which is determined by, but less than, the peaks of the input signal.

BRIEF DESCRIPTION OF THE DRAWINGS

The present invention will be described with reference to the accompanying drawings, in which.

DESCRIPTION OF THE PREFERRED EMBODIMENT

Figure 1:
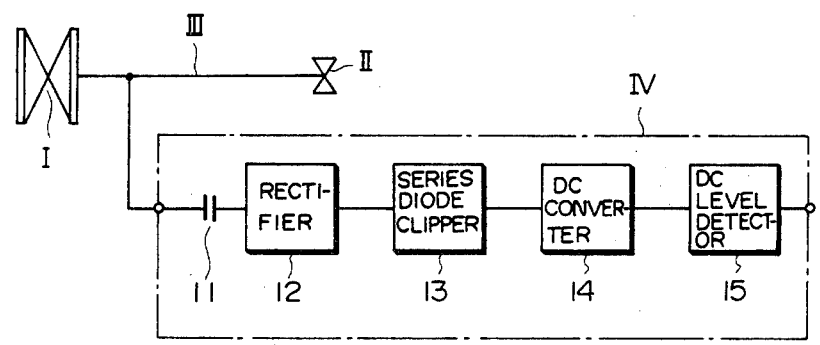
FIG. 1 is a block diagram illustrating an embodiment of this invention.

In FIG. 1 illustrating an embodiment of this invention, reference numeral 11 indicates a DC blocking capacitor; 12 designates a rectifier; 13 identifies a series diode clipper; 14 denotes a DC converter; and 15 represents a DC level detector. The above circuits make up the ringing signal detector IV.

Figure 2:
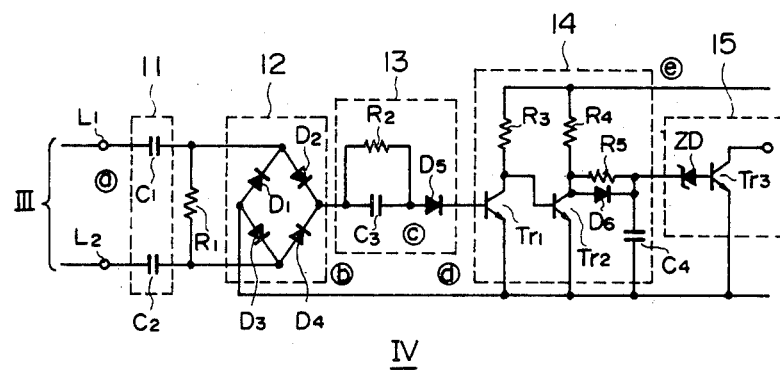
FIG. 2 is a circuit diagram illustrating an embodiment of this invention.

FIG. 2 shows an example of the circuit of this invention on the basis of the block diagram of FIG. 1, reference numerals corresponding to those in FIG. 1 respectively. In FIG. 2, reference characters $L_1$ and $L_2$ indicate terminals for the connection to the communication circuit II in FIG. 1; $C_1$ and $C_2$ designate capacitors, which make up the DC blocking capacitor; $R_1$ identifies a resistor for voltage dividing an input signal; and $D_1$ and $D_4$ denote diodes, which form the rectifier 12. Reference characters $C_3$, $R_2$ and $D_5$ represent a capacitor, a resistor and a diode, respectively, which constitute the series diode clipper. Reference characters $R_3$ to $R_5$, $C_4$ $D_6$ and $Tr_1$ and $Tr_2$ show resistors, a capacitor, a diode and transistors, respectively, which make up the DC converter 14, in which the capacitor $C_4$ is charged and discharged by the output from the series diode clipper 13. Reference characters ZD and $Tr_3$ refer to a Zener diode and a transistor, respectively, which constitute the DC level detector 14.

Figure 3:
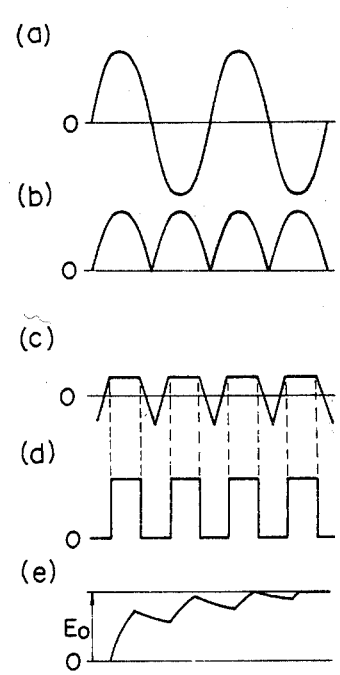
FIG. 3 shows waveforms produced at respective parts of the circuit shown in FIG. 2 when a ringing signal is applied thereto.
Figure 4:
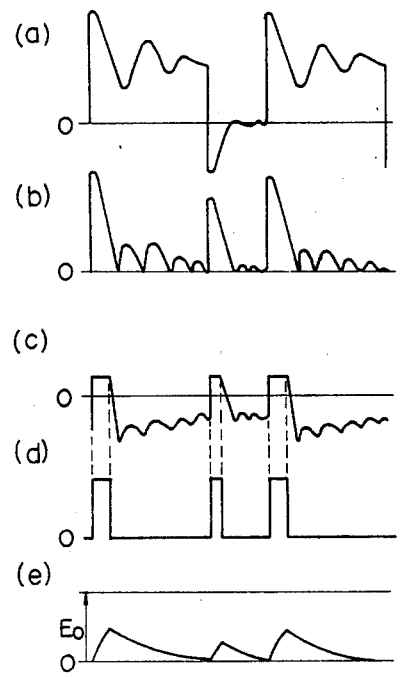
FIG. 4 shows waveforms produced at respective parts of the circuit shown in FIG. 2 when a dial pulse signal is applied thereto.

Referring to FIGS. 3 and 4 showing waveforms at respective parts of the ringing signal detector, the operation of the embodiment of FIG. 2 will be described in connection with a case of a 16 Hz ringing signal and a 10 pulses/second dial pulse signal.

In FIG. 3, waveforms (a) to (e) respectively show signal waveforms which are produced at parts (a) to (e) in the circuit diagram of FIG. 2 in response to the 16 Hz ringing signal. The 16 Hz ringing signal is a sine wave signal as shown in FIG. 3(a) which continues for a certain period of time (usually one second) and does not undergo any level change. After passing through the capacitors $C_1$ and $C_2$, the ringing signal is subjected to full-wave rectification by the rectifier 12 to provide such a wave as depicted in FIG. 3(b). This signal is applied next to the series diode clipper 13. Since the charging time constant of the capacitor $C_3$ is sufficiently smaller than the discharging time constant determined by the resistor $R_2$, the series diode clipper 13 is automatically biased by a predetermined voltage derived from the peak value of the full wave signal (b). The principle of the automatic biasing is known and no detailed description will be given. However, since the 16 Hz ringing signal is a signal of a constant level so that the peak value remains unchanged for the signal period, as shown in FIG. 3(a), a bias voltage across the capacitor $C_3$ in the series diode clipper 13 has a constant value determined by the peak value of the signal. The DC potential at the point (c) in FIG. 2 is negatively biased by a value corresponding to the bias voltage, with the result that the ringing signal waveform appearing at the point (c) in FIG. 2 takes such a form as shown in FIG. 3(c) which is negatively shifted. The peak value of this signal waveform exceeds the above mentioned predetermined voltage, which is determined by the forward voltage of the diode $D_5$ and the voltage across the base-emitter path of the transistor $Tr_1$, and a base current flows in the transistor $Tr_1$ through the diode $D_5$ to turn ON the transistor $Tr_1$ and to turn OFF the transistor $Tr_2$, thereby converting the 16 Hz ringing signal to pulses as shown in FIG. 3(d). The bias voltage produced by the series diode clipper 13 automatically changes to a large or small value in dependence on whether the input signal level is high or low, so that the peak potential of the signal appearing at the point (c) in FIG. 2 becomes constant and the width and hence the power of each pulse converted from the ringing signal by the above described mode of operation also becomes constant. Even if ringing signal voltages from a central office differ from one another (The ringing signal voltages fluctuate with conditions of communication circuits and the sites of installation.), the present circuit enables detection of the ringing signals under the same condition.

When the transistor $Tr_2$ is turned ON, a discharge loop of the capacitor $C_4$ is formed through the resistor $R_5$ and when the transistor $Tr_2$ is turned OFF, a charge loop of the capacitor $C_4$ is formed through the resistor $R_4$ and the diode $D_6$. By this mode of operation, the ringing signal of 16 Hz is converted to a DC potential if the values of the resistors $R_4$ and $R_5$ are set so that the charging time constant is smaller than the discharging time constant. When this potential exceeds the detection level $E_0$ as shown in FIG. 3(e), the Zener diode ZD renders the transistor $Tr_3$ conductive to provide an output.

In FIG. 4, waveforms (a) to (e) respectively show signal waveforms which are produced in the parts (a) to (e) in the circuit diagram of FIG. 2 in response to the dial pulse signal. The dial pulse signal is a square wave signal which is obtained by interrupting a DC voltage of the central office. However, in general, under the influence of the line of the communication circuit II and a relay coil of the central office, transient components accompanied by oscillations are detected at the rise and fall of the signal, making it difficult to distinguish the dial pulse signal from the ringing signal. In the present invention, by the provision of the series diode clipper 13 automatically biased, the transient parts of the dial pulse signal are suppressed to prevent the ringing signal receiving circuit from responding to the dial pulse signal.

As is the case with the ringing signal, after passing through the DC blocking capacitor 11, the dial pulse signal is rectified by the rectifier 12 to provide such a waveform as depicted in FIG. 4(b) and the rectifier output is applied to the series diode clipper 13. As described above with regard to the operation in the case of the ringing signal, the series diode clipper 13 is automatically biased by the action of the capacitor $C_3$. However, when the input signal is the dial pulse signal, the dial pulse signal applied to the series diode clipper 13 is such a signal as depicted in FIG. 4(b) which has large peak values at the rise and fall of each dial pulse and small peak values at other parts, unlike the ringing signal of uniform peak values shown in FIG. 3(b). The bias voltage across the capacitor $C_3$ becomes the above-mentioned voltage determined by the rise and fall portions of the dial pulse having large peak values. Since the DC potential at the point (c) in FIG. 2 is negatively biased by the bias voltage, the waveform of the dial pulse appearing at the point (c) in FIG. 2 has such a form as shown in FIG. 4(c) which is negatively shifted, and the resulting voltage does not exceed the above-mentioned predetermined voltage determined by the forward voltage of the diode $D_5$ and the voltage across the base-emitter path of the transistor $Tr_1$ at portions other than the rise and fall of each dial pulse. As a consequence, each pulses obtained by the transistors $Tr_1$ and $Tr_2$ are smaller in number and narrower in pulse width than the pulses of the ringing signal, so that when the pulses are converted to the DC potential of the capacitor $C_4$, the DC potential is low and does not rise up to the DC potential at which the DC level detector 15 operates. Thus, the dial pulse signal and the ringing signal can be distinguished from each other. Unless the series diode clipper 13 automatically biased is used, the transistors $Tr_1$ and $Tr_2$ respond to the oscillating components of the dial pulse signal shown in FIG. 4(b), and the number of output pulses depicted in FIG. 4(d) increases to raise the DC potential of the capacitor $C_4$ and the DC level detector 15 operates, thereby making it impossible to discriminate the dial pulse signal and the ringing signal from each other.

In the above embodiment, the rectifier 12 inserted at the preceding stage of the series diode clipper 13 is to enhance the overall efficiency and need not always be provided. Even if a half-wave or full-wave rectifier is not used, the operation of the ringing signal detector of this invention is substantially the same as described above, and the detector can be sufficiently operated by a suitable selection of the time constants of the series diode clipper 13 and the DC converter 14.

As described in detail above, since the series diode clipper is provided which is automatically biased by an input signal, it is possible to detect with the ringing signal detector itself whether or not the input signal is a ringing signal. Accordingly, the ringing signal detector dispenses with a monitor relay used in the prior art and hence becomes inexpensive and the detecting sensitivity can be enhanced. Therefore, the ringing signal detector is capable of handling a variety of ringing signal voltages, and hence extends the range of installation of terminal equipments. Further, the circuit of this invention has the advantage that a terminal equipment connected in parallel to a telephone set is prevented from erroneous starting in response to a dial pulse signal.

What is claimed is:

1. A ringing signal detector, comprising a series diode clipper having an automatically biased clipper level biased by a predetermined constant voltage determined by selected peak values of an input signal, said selected peak values of the input signal exceeding said automatically biased clipper level of said series diode clipper, a DC converter responsive to output pulses from said series diode clipper for converting the output pulses of the series diode clipper to DC signals, a DC level detector responsive to said DC signals for detecting whether or not the DC signals are above a predetermined level and generating an output signal when the level of said DC signals exceeds said predetermined level to indicate a ringing signal has been detected.

2. A ringing signal detector according to claim 1, further comprising a rectifier circuit preceding said series diode clipper.

3. A ringing signal detector according to claim 1, in which said series diode clipper comprises: a resistor and a capacitor connected in parallel, and a diode connected in series with said parallel connection of said capacitor and resistor.

4. A ringing signal detector, comprising: a series diode clipper circuit for clipping an input signal applied thereto, said series diode clipping circuit including a diode and automatic biasing means responsive to peak values of the input signal for biasing said diode to define a clipping level according to the peak values of the input signal; a DC converter receptive of the clipped input signal from said series diode clipper circuit for developing an output DC signal having a DC signal level corresponding to the power of clipped peaks of the input signal; and a DC level detector responsive to the DC output signal from said DC converter for developing an output signal when the DC input signal exceeds a certain value corresponding to a ringing signal input signal applied to said series diode clipper circuit.

5. A ringing signal detector according to claim 4, wherein said automatic biasing means of said series diode clipping circuit is comprised of a resistor and a capacitor connected in parallel with each other and in series with said diode.

6. A ringing signal detector according to claim 4, further comprising a rectifier connected in series with said series diode clipping circuit for rectifying an input signal and from applying the rectified input signal to said series diode clipping circuit.

* * * * *